United States Patent [19]

Tominaga

[11] Patent Number: 5,364,708
[45] Date of Patent: Nov. 15, 1994

[54] OPTICAL RECORDING MEDIUM
[75] Inventor: Junji Tominaga, Nagano, Japan
[73] Assignee: TDK Corporation, Tokyo, Japan
[21] Appl. No.: 835,897
[22] Filed: Feb. 14, 1992
[30] Foreign Application Priority Data Feb. 20, 1991 [JP] Japan .................. 3-047818

[51] Int. Cl.⁵ ............................................. B41M 5/34
[52] U.S. Cl. ................................ 428/626; 428/632; 428/676; 428/660; 428/673; 369/100; 369/284; 430/945
[58] Field of Search ............... 428/632, 676, 673, 674, 428/660, 626; 369/100, 284, 288; 430/495, 945

[56] References Cited

U.S. PATENT DOCUMENTS

| 4,371,954 | 2/1983 | Cornet ........................... | 369/109 |
| 4,388,400 | 6/1983 | Tabei et al. .................... | 430/495 |
| 4,576,639 | 3/1986 | Suzuki et al. ................... | 420/900 |
| 4,773,059 | 9/1988 | Minemura et al. ............... | 369/108 |
| 4,839,883 | 6/1989 | Nagata et al. .................. | 369/100 |
| 4,855,992 | 8/1989 | Ikegawa et al. ................. | 369/100 |
| 4,918,682 | 4/1990 | Finegan ......................... | 369/100 |
| 5,118,541 | 6/1992 | Yamamoto et al. .............. | 369/284 |
| 5,155,723 | 10/1992 | Hamada et al. ................ | 369/100 |

FOREIGN PATENT DOCUMENTS

| 0347801 | 12/1989 | European Pat. Off. . |
| 60-29949 | 2/1985 | Japan . |
| 62-40650 | 2/1987 | Japan . |
| 63-115795 | 5/1988 | Japan . |
| 63-161544 | 7/1988 | Japan . |
| 1-296441 | 11/1989 | Japan . |
| 2121889 | 5/1990 | Japan . |
| 3-256243 | 11/1991 | Japan .................. | 369/284 |
| 4-26937 | 1/1992 | Japan .................. | 369/284 |

OTHER PUBLICATIONS

Derwent Pubs. Ltd., London, GB, AN90-188368 Database WPIL Week 9025, Abstract for JP 2-121,889, 1990.
Illustrative Material for Copper Base Shape Memory Alloys Journal of Japan Copper Drawing Association; May 1988, Mitsubishi Metal Corporation; p. 129 + bibliography.

Primary Examiner—John Zimmerman
Assistant Examiner—N. M. Nguyen
Attorney, Agent, or Firm—Watson, Cole, Grindle & Watson

[57] ABSTRACT

A recording layer 3 including shape-memory alloy thin films 311, 312 and a hydrogen storage alloy thin film 32, a dielectric thin film 4, and a reflective thin film 5 are stacked on a surface of a substrate 2 in the described order. Irradiation of recording light causes the hydrogen storage alloy thin film 32 to release hydrogen gas and contract in volume at the same time, creating a space 321 in the film. The shape-memory alloy thin films 311, 312 are deformed by the gas pressure in space 321, allowing space 321 to enlarge its thickness. Upon exposure to erasing light, shape-memory alloy thin films 311, 312 tend to restore their shape prior to deformation, applying pressure to the hydrogen gas in space 321 so that the hydrogen gas is occluded again and space 321 is substantially extinguished. Reversible release and occlusion of hydrogen gas enables to rewrite the recording information.

3 Claims, 1 Drawing Sheet

OPTICAL RECORDING MEDIUM

FIELD OF THE INVENTION

This invention relates to a rewritable optical recording medium.

BACKGROUND OF THE INVENTION

Optical recording media, typically optical recording disks are of great interest as large capacity information recording media. Such optical recording media include those of the rewritable type such as phase change optical recording media and magneto-optical recording media and those of the write-once type such as pit formation type optical recording media.

DISCLOSURE OF THE INVENTION

An object of the present invention is to provide a novel construction of rewritable type optical recording medium.

This and other objects are achieved by the present invention as defined below from (1) to (7). (1) An optical recording medium comprising a recording layer, a dielectric thin film, and a reflective thin film stacked on a surface of a substrate in the described order, said recording layer comprising a hydrogen storage alloy thin film and a shape-memory alloy thin film disposed on at least one side of said hydrogen storage alloy thin film. (2) The optical recording medium of (1) wherein said shape-memory alloy thin film is 100 to 1,000 Å thick and said hydrogen storage alloy thin film is 100 to 500 Å thick. (3) The optical recording medium of (1) or (2) wherein said shape-memory alloy thin film is formed of a Cu-Zn-Al base alloy. (4) The optical recording medium of any one of (1) to (3) wherein said hydrogen storage alloy thin film is formed of an La—Ni or Fe—Ti base alloy. (5) The optical recording medium of any one of (1) to (4) wherein said dielectric thin film is 500 to 5,000 Å thick. (6) The optical recording medium of any one of (1) to (5) wherein said dielectric thin film contains Si and O and/or N. (7) The optical recording medium of any one of (1) to (6) wherein said reflective thin film is comprised of a member selected from the group consisting of Ag, Al, Au, Pt and Cu and an alloy containing at least one of these elements.

OPERATION AND ADVANTAGES OF THE INVENTION

Referring to FIG. 1, the optical recording medium 1 of the present invention is shown as comprising a recording layer 3, a dielectric thin film 4, and a reflective thin film 5 stacked on a surface of a substrate 2 and further comprising a protective film 6 on the reflective thin film 5 wherein the recording layer 3 consists of a shape-memory alloy thin film 311, a hydrogen storage alloy thin film 32, and a shape-memory alloy thin film 312.

Recording is done by directing recording laser light to recording layer 3 from the back surface of substrate 2 through substrate 2. The hydrogen storage alloy thin film 32 which is formed by sputtering in a hydrogen atmosphere has already occluded hydrogen therein. Such hydrogen storage alloy thin film 32 is heated by the recording laser light whereby the hydrogen occluded therein is released. As the hydrogen storage alloy decreases its volume by about 25% as a result of hydrogen release, a space 321 full of hydrogen gas is created where the recording laser light is irradiated.

Within space 321, optical constants including an index of refraction n (the real part of a complex index of refraction) and a coefficient of extinction k (the imaginary part of a complex index of refraction) are changed from those in hydrogen storage alloy thin film 32, resulting in changes of multiple reflection conditions and a lowering of reflectivity therewith.

On the other hand, shape-memory alloy thin films 311 and 312 are formed of a shape-memory alloy capable of reversible shape change in accordance with cooling and heating. The shape-memory alloy undergoes thermoelastic martensitic transformation (M transformation) in that a martensite phase (M phase) is created when the matrix phase is cooled to the M transformation temperature (Ms point) or lower. When the shape-memory alloy having M phase formed therein is deformed and then heated, the M phase is inversely transformed into the matrix phase at the inverse transformation temperature (As point) or higher whereupon the matrix phase assumes just the same crystallographic orientation as prior to deformation. Thus the alloy resumes the shape prior to deformation when it is heated to As point or higher. The shape-memory alloy change its shape no longer when it is cooled to Ms point or lower again for transformation into M phase.

The recording laser light heats hydrogen storage alloy thin film 32, releasing hydrogen to create space 321 within hydrogen storage alloy thin film 32.

At the same time, shape-memory alloy thin films 311, 312 are heated upon exposure to the recording laser light. Although the Ms point of shape-memory alloy noticeably varies with its composition, a composition is preferably selected in the practice of the invention such that the Ms point is higher than the temperature reached upon recording. It will be understood that the Ms point need not be always higher than the temperature at which the hydrogen storage alloy thin film releases hydrogen since the shape-memory alloy thin films dissipate heat quickly due to their contact with substrate 2 and dielectric thin film 4.

With this construction, the shape-memory alloy thin films 311, 312 having M phase created therein are deformed by forces resulting from the pressure of hydrogen gas in space 321 so that space 321 enlarges its thickness, resulting in a further lowering of reflectivity.

Additionally, shape-memory alloy thin films 311, 312 lower their own reflectivity when heated, also contributing to a lowering of the reflectivity of optical recording medium 1.

In the optical recording medium of the present invention, the once recorded information is erased by heating shape-memory alloy thin films 311, 312 to As point or higher. With this heating, the shape-memory alloy thin films tend to resume the shape prior to irradiation of recording laser light, applying pressure to the hydrogen gas in space 321. Since hydrogen storage alloy thin film 32 is capable of reversibly intercalating and deintercalating hydrogen, the pressure applied from shape-memory alloy thin films 311, 312 causes hydrogen storage alloy thin film 32 to take in the hydrogen gas from space 321 again, virtually extinguishing space 321. In this way, optical recording medium 1 resumes the state prior to irradiation of recording laser light and is again ready for information recording.

It will be understood that any information can be selectively erased by directing erasing laser light to the recorded site for erasing. Erasing can also be effected by heating shape-memory alloy thin films 311, 312 over their entire surface, in which case substrate 2 should preferably be heat resistant.

FIGS. 2 and 3 show optical recording media 1 in which the recording layer 3 has a two layer structure consisting of a shape-memory alloy thin film 31 and a hydrogen storage alloy thin film 32. The operations of recording and erasing information are the same as described for the optical recording medium 1 of FIG. 1. It will be understood that the construction shown in FIG. 1 exhibits better erasing performance since shape-memory alloy thin films 311, 312 are located on opposite sides of hydrogen storage alloy thin film 32 so that substantially uniform pressures may be applied to hydrogen storage alloy thin film 32 from the opposite sides.

It is to be noted that the optical recording medium of the present invention can be used as a rewritable optical recording disk capable of reproduction in accordance with the compact disk standard because unrecorded portions have a reflectivity of 75% or higher and recorded portions have a reflectivity decreased to 40% or lower. Further, since such a reflectivity change is available in the wavelength range of about 300 to 900 nm adjusting the thickness of the respective thin films, short wavelength recording is possible which leads to a higher recording density.

BEST MODE FOR CARRYING OUT THE INVENTION

Now, the illustrative construction of the present invention is described in more detail.

Figure 1:
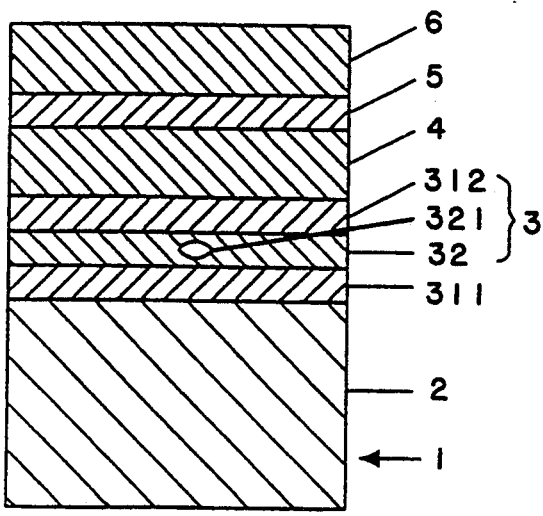
FIG. 1 is a fragmentary cross-sectional view of an optical recording medium according to one preferred embodiment of the present invention.
Figure 2:
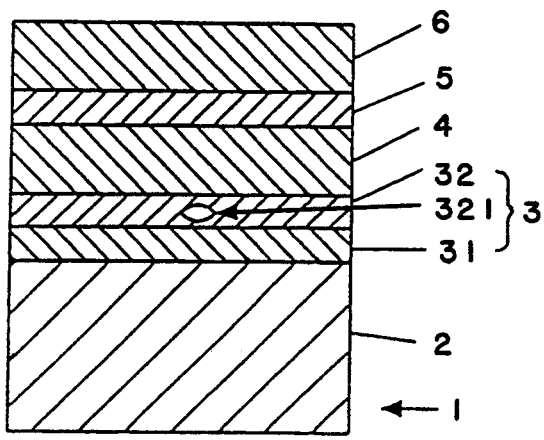
FIG. 2 is a fragmentary cross-sectional view of an optical recording medium according to another preferred embodiment of the present invention.
Figure 3:
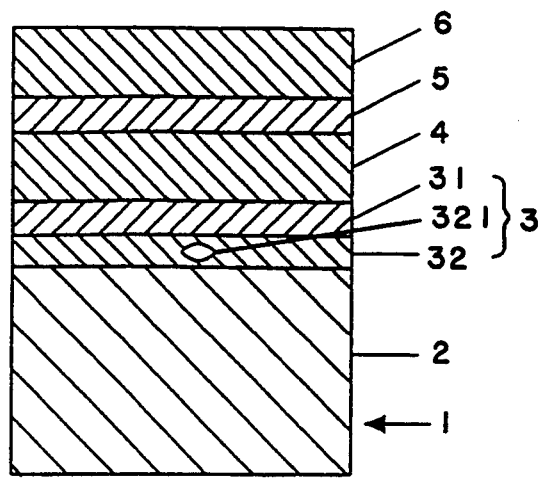
FIG. 3 is a fragmentary cross-sectional view of an optical recording medium according to a further preferred embodiment of the present invention.

FIGS. 1 to 3 show optical recording media according to several preferred embodiments of the present invention.

The optical recording medium 1 is shown as comprising a recording layer 3, a dielectric thin film 4, a reflective thin film 5, and a protective film 6 stacked on a surface of a substrate 2 in the described order.

Substrate 2

Since optical recording medium 1 is designed such that recording light and reproducing light are directed to recording layer 3 through substrate 2, substrate 2 should be substantially transparent to the light. Various resins including acrylic resins, polycarbonate resins, epoxy resins, and polyolefin resins may be used as well as glass.

The substrate 2 is not particularly limited in shape and dimensions although it is generally of disk shape, typically having a thickness of about 0.5 to 3 mm and a diameter of about 50 to 360 mm.

If necessary, substrate 2 on the surface may be provided with a predetermined pattern of grooves or the like for tracking and addressing purposes.

Recording Layer 3

The recording layer 3 is shown in FIG. 1 as consisting of shape-memory alloy thin films 311, 312 on opposite sides of a hydrogen storage alloy thin film 32. The recording layer 3 is shown in FIGS. 2 and 3 as consisting of a shape-memory alloy thin film 31 on one side of a hydrogen storage alloy thin film 32.

The shape-memory alloy thin films 31, 311, 312 are formed of shape-memory alloys. The composition of shape-memory alloy used is not particularly limited although Ni—Ti alloys and copper base shape-memory alloys are preferred because of better shape memory and ease of manufacture. The more preferred copper base shape-memory alloys are Cu—Zn—Al alloys. The composition and behavior of these shape-memory alloys are described in "Fundamentals and Industrial Technology of Copper and Copper Alloys", Japan Copper Drawing Association, May 1988.

Preferably, shape-memory alloy thin films 311, 312 have a total thickness of 100 to 1,000 Å, especially 300 to 700 Å. If the total thickness is below the range, the effect of extinguishing space 321 upon erasing of recorded information becomes insufficient, making it difficult to use the optical recording medium as a rewritable one. If the total thickness is beyond the range, reflectivity becomes short due to light absorption through the shape-memory alloy thin films.

The thickness of the respective shape-memory alloy thin films 311, 312 is suitably selected such that their total thickness may fall within the above-defined range although it is preferred that the thickness of one thin film is at least about 30% of the total thickness.

In the embodiments shown in FIGS. 2 and 3 having only one shape-memory alloy thin film, its thickness is preferably in the same range as the above-mentioned total thickness.

Preferably, the shape-memory alloy thin film is formed by gas phase growth techniques such as sputtering and evaporation techniques.

The hydrogen storage alloy thin film 32 is formed of a hydrogen storage alloy. The hydrogen storage alloy used herein may be selected from conventional hydrogen storage alloys, for example, La—Ni base alloys and Fe—Ti base alloys which are preferred ones.

The hydrogen storage alloy thin film 32 is preferably 100 to 500 Å, especially 100 to 300 Å thick. If the thickness is below the range, the space 321 is formed to an insufficient thickness to provide a substantial lowering of reflectivity. If the thickness is beyond the range, sufficient reflectivity is hardly available due to light absorption through the hydrogen storage alloy thin film.

Since hydrogen storage alloy thin film 32 should have hydrogen occluded therein according to the present invention, it is preferred to form hydrogen storage alloy thin film 32 by reactive sputtering in an atmosphere containing hydrogen gas. The pressure during reactive sputtering is preferably from 0.5 to 10 Pa. Hydrogen gas is preferably used in admixture with an inert gas such as Ar while the flow rate of hydrogen gas preferably ranges from 10 to 50% of the total gas flow rate. Hydrogen storage would be often short with a hydrogen gas flow rate below the range whereas a hydrogen gas flow rate beyond the range would aggravate sputtering efficiency requiring a too time to grow a hydrogen storage alloy film.

It is to be noted that the presence of space 321 created in hydrogen storage alloy thin film 32 is indirectly confirmed by the fact that the reflectivity measured is substantially coincident with the reflectivity calculated with the proviso that the space has an index of refraction of approximately 1.

Dielectric Thin Film 4

The dielectric thin film 4 is provided for the purposes of improving reflectivity and amplifying a reflectivity change. The dielectric material of which dielectric thin film 4 is formed is not particularly limited, and use may be made of silicon oxide such as $SiO_2$, silicon nitride such as $Si_3N_4$, various dielectric materials such as LaSiON and SiAlON, various glasses, and dielectric materials containing Si and O and/or N.

Besides, such materials as SiC and ZnS are also useful. Mixtures of the aforementioned compounds, for example, a mixture of $SiO_2$ and about 10 to 50% of ZnS may be used.

The thickness of dielectric thin film 4 is not particularly limited and may be properly selected in accordance with the associated conditions including the type of material used, optical parameters of shape-memory alloy thin film and hydrogen storage alloy thin film, and the wavelength of reproducing laser light. In general, it is 1,000 to 5,000 Å, preferably 2,000 to 3,500 Å thick.

Preferably, dielectric thin film 4 is formed by gas phase growth techniques such as sputtering and evaporation techniques.

Reflective Thin Film 5

The reflective thin film 5 is preferably formed of high reflectivity metals and alloys, which may be properly selected from metals such as Ag, Al, Au, Pt, and Cu and alloys containing at least one of these elements.

The reflective thin film 5 is preferably 300 to 1,500 Å thick. A thickness below the range is unlikely to provide sufficient reflectivity. A thickness beyond the range achieves only a slight improvement in reflectivity at the sacrifice of cost.

Preferably, reflective thin film 5 is formed by gas phase growth techniques such as sputtering and evaporation techniques.

Protective Film 6

The protective film 6 is provided for the purposes of improving scratch resistance and corrosion resistance and preferably formed of various organic materials, especially radiation curable compounds or their compositions which are cured with radiation such as electron radiation and ultraviolet light.

The protective film 6 is usually about 0.1 to 100 $\mu$m thick. It may be formed by conventional techniques such as spin coating, gravure coating, spray coating, and dipping techniques.

Medium Structure

Although the embodiments wherein the present invention is applied to optical recording media of the one side recording type have been described, the present invention is also applicable to optical recording media of the double side recording type.

The present invention is applied to optical recording media of the double side recording type by mating a pair of substrates 2 such that recording layer 3 is sealed inside.

Also contemplated herein is a medium of the one side recording type having a protective plate adhesively bonded to the protective film 6. The protective plate used herein may be of the same material as substrate 2 although other materials may be used because the protective plate need not be transparent.

EXAMPLE

Examples of the present invention are given below by way of illustration.

EXAMPLE 1

An optical recording disk, sample No. 1, was fabricated by forming a recording layer 3, a dielectric thin film 4, a reflective thin film 5 and a protective film 6 of UV curable resin on a surface of a substrate 2. The recording layer 3 was of the construction shown in FIG. 1, that is, consisted of a hydrogen storage alloy thin film 32 sandwiched between a pair of shape-memory alloy thin films 311, 312.

The substrate 2 used was a disk having a diameter of 133 mm and a thickness of 1.2 mm injection molded from polycarbonate resin with grooves configured at the same time.

Each shape-memory alloy thin film was formed from a Cu—Zn—Al alloy to a thickness of 250 Å by sputtering.

The hydrogen storage alloy thin film 32 was formed from a Fe—Ti alloy to a thickness of 100 Å by reactive RF sputtering in an atmosphere containing hydrogen gas and Ar gas. The sputtering pressure was 1 Pa, the flow rate of hydrogen gas was 2 SCCM, and the flow rate of Ar was 10 SCCM.

The dielectric thin film 4 was formed from $SiO_2$ to a thickness of 3,000 Å by sputtering.

The reflective thin film 5 was formed from Ag to a thickness of 500 Å by sputtering.

The protective film 6 was formed by applying a UV curable resin by a spin coating technique and exposing the resin to UV for curing. It was 5 $\mu$m thick at the end of curing.

Sample No. 1 was subjected to recording/reproducing operation. Laser light of 8 mW was directed for recording and laser light of 0.5 mW directed for reproduction. The laser light had a wavelength of 780 nm.

The results were that unrecorded portions had a reflectivity of 75% and recorded portions had a reflectivity of 20%.

Next, laser light of 15 mW was directed to the recorded site which was reproduced again to find that the reflectivity was recovered to 70%, indicating that the recorded information was erased. After erasing, recording laser light was directed again to find that the reflectivity was lowered to 20%, indicating information rewriting capability.

EXAMPLE 2

Optical recording disks of the constructions of FIGS. 2 and 3 were fabricated in the same manner as in Example 1 except that the shape-memory alloy thin film 31 had a thickness of 500 Å.

These samples insured recording, erasing and recording capabilities like sample No. 1 of Example 1.

EXAMPLE 3

Optical recording disk samples were fabricated in the same manner as in each of the foregoing Examples except that the reflective thin film 5 was formed of Al, Au, Pt, Cu or an alloy containing at least one of these elements.

Also, optical recording disk samples were fabricated in the same manner as in each of the foregoing Examples except that the hydrogen storage alloy thin film 32 was formed from an La—Ni alloy.

Further, optical recording disk samples were fabricated in the same manner as in each of the foregoing Examples except that the dielectric thin film 4 was formed from $Si_3N_4$ to a thickness of 2,200 Å.

These samples insured recording, erasing and re-recording capabilities like the foregoing Examples.

I claim:

1. An optical recording medium, comprising
   a resin substrate;
   a recording layer comprising a hydrogen storage alloy thin film and a shape-memory alloy thin film disposed on at least one side of said hydrogen storage alloy thin film, said shape-memory alloy thin film is formed of a Cu—Zn—Al base alloy and said hydrogen storage alloy thin film is formed of an Fe—Ti base alloy, information being recorded in said recording layer upon irradiation of recording light thereon by the release of hydrogen gas from said hydrogen storage alloy thin film, and said information being erased in said recording layer by occluding said hydrogen gas in said hydrogen storage alloy thin film upon irradiation of erasing light thereon;
   a dielectric thin film and containing an oxide; and
   a reflective thin film stacked on a surface of said resin substrate, said reflective thin film comprises silver and an alloy containing at least silver.

2. An optical recording medium according to claim 1, wherein said shape-memory alloy thin film is 100 to 1,000 Å thick and said hydrogen storage alloy thin film is 100 to 500 Å thick.

3. An optical recording medium according to claim 1, wherein said dielectric thin film is 500 to 5,000 Å thick.

* * * * *